United States Patent
Kopp

(10) Patent No.: US 7,307,357 B2
(45) Date of Patent: Dec. 11, 2007

(54) METHOD AND SYSTEM TO INCREASE THE THROUGHPUT OF A COMMUNICATIONS SYSTEM THAT USES AN ELECTRICAL POWER DISTRIBUTION SYSTEM AS A COMMUNICATIONS PATHWAY

(75) Inventor: Lowell Ellis Kopp, Winchester, MA (US)

(73) Assignee: Amperion, Inc., Tewksbury, MA (US)

( * ) Notice: Subject to any disclaimer, the term of this patent is extended or adjusted under 35 U.S.C. 154(b) by 1337 days.

(21) Appl. No.: 10/261,364

(22) Filed: Sep. 30, 2002

(65) Prior Publication Data

US 2004/0070912 A1    Apr. 15, 2004

(51) Int. Cl.
*H02J 3/02* (2006.01)
(52) U.S. Cl. .......................................... 307/3
(58) Field of Classification Search ..................... 307/3
See application file for complete search history.

(56) References Cited

OTHER PUBLICATIONS

Agilent AN 1298 Application Note, "*Digital Modulation in Communications Systems—An Introduction*," Agilent Technologies, 2000, 47 pages.

*Primary Examiner*—Robert L. DeBeradinis
(74) *Attorney, Agent, or Firm*—Alfred A. Fressola; Ware, Fressola, Van Der Sluys & Adolphson LLP

(57) ABSTRACT

A method and system to increase the throughput of a communications system that uses an electrical power distribution system as a communications pathway, determines the phase of the power distribution power cycle and compares this determined phase to predetermined regions of the power cycle. If the power cycle is within a predetermined region, a particular communication scheme is used for transmitting and receiving information. The power cycle can have two or more predetermined regions. Optionally, the throughput for any or all regions can be determined so as to provide for modification of the associated communication scheme if the throughput is determined to be outside some predetermined range.

31 Claims, 5 Drawing Sheets

METHOD AND SYSTEM TO INCREASE THE THROUGHPUT OF A COMMUNICATIONS SYSTEM THAT USES AN ELECTRICAL POWER DISTRIBUTION SYSTEM AS A COMMUNICATIONS PATHWAY

TECHNICAL FIELD

The present invention relates to a method and system for increasing throughput associated with broadband power line communications using an electrical power distribution system, such as medium voltage power cables, as a communications pathway.

BACKGROUND OF THE INVENTION

Use of electrical power distribution systems, such as medium (MV) voltage power lines (cables) as a communications pathway for broadband communications is a relatively new technology. Current practice with regard to such medium voltage power line communications (PLC) have treated the power line as a simple conductor with either a specified noise distribution (such as a Gaussian noise distribution) or as an unspecified noise distribution. Noise distributions that are related to the phase of the power cycle at any instant in time have been ignored. It is known that there are noise sources associated with power distribution and in particular, medium voltage power distribution. At least some of these noise sources correlate with either the voltage or current of the 50/60 Hz power distribution waveform. For example, gap noise is the noise associated with the coupling of power line cables to one another or to devices such as line transformers, sectionalizers, reclosers and fuses. Over time, such couplings can corrode, causing regions that can act as higher resistance, and/or rectifying elements. Microarcing can occur at such couplings as the power cycle periodically approaches its peak value. Thus microarcing is a form of high frequency noise that is associated with a certain region(s) of the power cycle.

Another potential noise source for PLC systems are non-linear coupler response curves that may cause increasing signal phase distortion as power line current increases in magnitude during each power cycle.

Prior art systems do not attempt to modify the communications system during the presence of such noise that occurs during certain regions of the power cycle. Current systems use a single signal encoding method and modulation scheme for comparatively long periods of time and only occasionally modify them to adapt the changing environmental conditions. Such modifications are not related to the phase of the power cycle.

SUMMARY OF THE INVENTION

The present invention is directed to increasing the throughput of a communications system in the presence of periodic noise level variations associated with the phase of an electrical power distribution power cycle by determining the phase of the power cycle and modifying the communication scheme when the phase is within predetermined regions of the power cycle, where such regions are known to be associated with different levels/types of noise that can affect the throughput of the communications system. By modifying the communication scheme as the power cycle phase enters these predetermined regions, the overall throughput of the communications system can be increased.

As used herein, the phrase "communication scheme" encompasses the overall technique used to convey information from one place to another. As such, the phrase includes the encoding scheme used, such as any of the various digital modulation formats; including binary phase shift keying (BPSK) and quadrature amplitude modulation (QAM), as well as any forward error correction (FEC) scheme used, such as Reed-Solomon encoding, convolutional encoding or Turbo codes, that are commonly used in broadband communications. The communication scheme is not associated with any particular type of multiplexing of the radio frequency signal, and thus can be used with any such multiplexing technique, including Frequency Division Multiple Access (FDMA), Time Division Multiple Access (TDMA) and Code Division Multiple Access (CDMA). Although the communication scheme is generally for transmitting digital information, it need not be restricted to the transmission of digital information. As such the phrase "communication scheme" means any method of conveying information from one place to another.

In the present invention, the power cycle is partitioned into two or more regions and for each region, an appropriate communication scheme is applied which is dependent upon the type of noise present in that region. Thus for instance, in a region of the power cycle on either side of the zero-voltage crossing (that is, where the voltage is zero) the electrical noise typically associated with high voltage at the peaks of the power cycle is usually low. As such, "high voltage" noise is therefore usually minimal during this zero-voltage crossing region. As a result, a communication scheme may be selected having a higher bandwidth efficiency than when communicating in the peak voltage region of the power cycle. Such a communication scheme during the zero-voltage crossing region could, for instance, use a more bandwidth efficient modulation scheme (such as QAM-64, versus QAM-16) and/or lower error correction overhead (such as fewer error correction bits).

BRIEF DESCRIPTION OF THE DRAWINGS

For a fuller understanding of the nature and objects of the present invention, reference should be made to the following detailed description, taken in conjunction with the following drawings in which.

BEST MODE FOR CARRYING OUT THE INVENTION

Overview of Communications System

Figure 1:
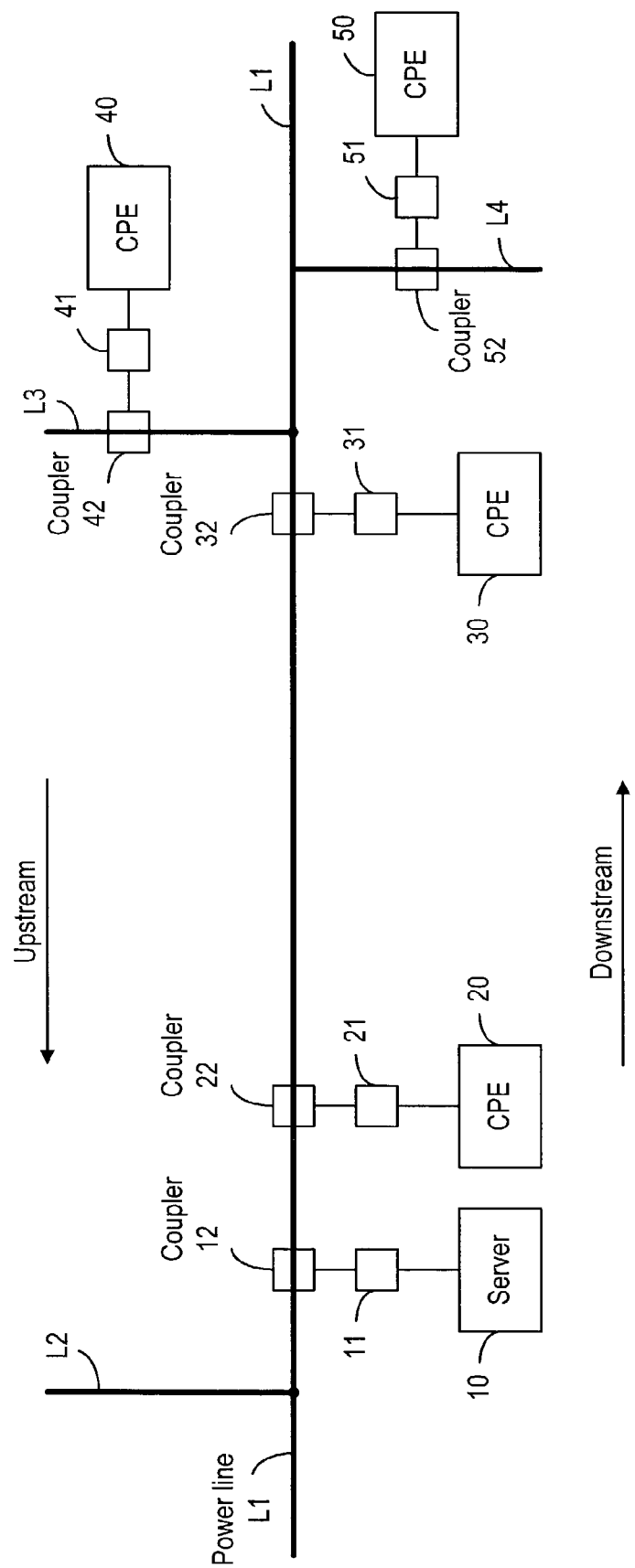
FIG. 1 is an overall diagrammatic representation of a communications system using an electrical power distribution system as a communications pathway.

As best seen in FIG. 1, in power-line communications (PLC), utility power lines (cables), especially the high-voltage (HV, 60 kVAC and up) and medium-voltage (MV, 4-35 kVAC) power lines, are used as a communication pathway. The MV power lines are generally used to power the primaries of distribution transformers feeding electric power to homes and businesses. It is advantageous to convey communication signals in radio frequencies (RF).

A typical scenario in PLC is shown in FIG. 1. As shown, a main power line L1 and a number of other power lines L2, L3, L4 branching off from L1 are used to carry electrical power and can be used as a communications pathway for communication signals. A server 10 is used at a distribution center to receive information from service providers and to send the information to a plurality of customers downstream. The server 10 uses a coupler 12 and an associated distribution modem 11 to broadcast the communication signals on power line L1 so that customers can receive the signals using their customer premise equipment (CPE). For example, CPE 20 and CPE 30 acquire the signals from L1 via couplers 22, 32 and associated modems 21, 31, while CPE 40 acquires the signals from L3 via a coupler 42 and an associated modem 41, and so on. In the upstream direction, customers can use their CPE to send request data to the server via the same couplers and modems. The PLC shown in FIG. 1 does not show the use of digital repeaters or bridges, since the concepts of the present invention do not require their presence. Such devices may be required in any particular PLC, depending upon its length and configuration.

The overall PLC system thereby provides the ability to send and receive both narrowband and broadband communications by use of the power distribution system as a communications pathway.

Details of Method and System to Increase Throughput

Figure 2:
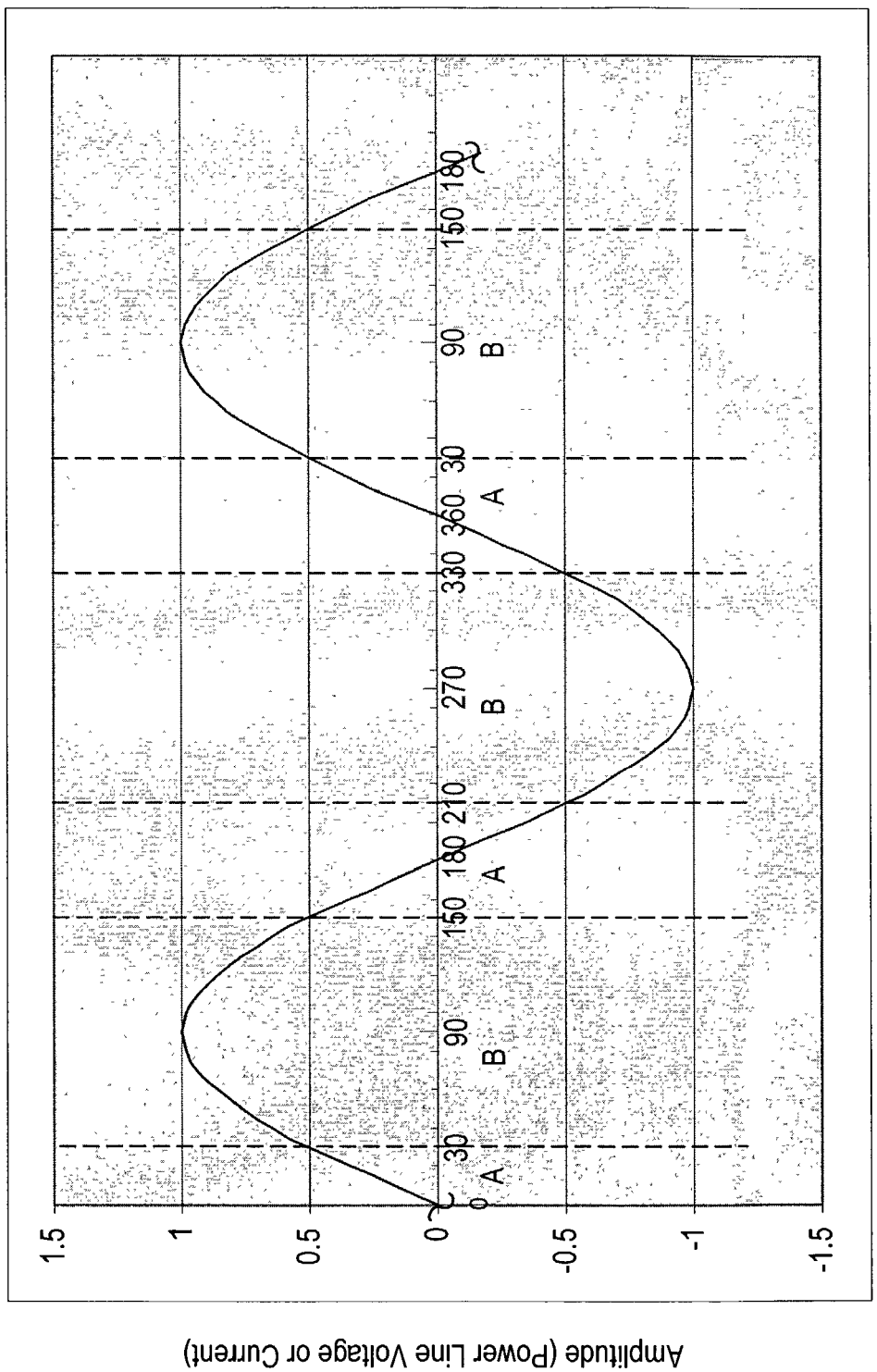
FIG. 2 is an illustration of a typical electrical power distribution power cycle showing how the power cycle can be partitioned into two (or more) regions associated with the phase of the power cycle.

The type of noise found on the MV cable may vary during the power cycle such as less high voltage noise during the portion of the power cycle around the zero-voltage crossing (such as Regions A shown in FIG. 2) and high voltage noise more prominent during the peak voltage excursion of the power cycle, (such as shown in Regions B of FIG. 2). There may also be other noise associated with the power cycle in regions that are within or span across Region A and/or Region B. In fact, such noise may change over time, yet be phase related to the power cycle.

The present invention improves power line communications (PLC) throughput by use of different communication schemes during each region of the power cycle. Thus the noise sources that correlate with either voltage or current levels of the power cycle can be advantageously dealt with by adjusting communications scheme used for that region. It should be noted that the phrase "communication scheme" encompasses the overall technique used to convey information from one place to another. As such, the phrase includes the encoding scheme used, such as any of the various digital modulation formats, including binary phase shift keying (BPSK) and quadrature amplitude modulation (QAM), as well as any forward error correction scheme used in communications. The communication scheme is not associated with any particular type of multiplexing of the radio frequency signal, and thus can be used with any such multiplexing technique, including Frequency Division Multiple Access (FDMA), Time Division Multiple Access (TDMA) and Code Division Multiple Access (CDMA). Although the communication scheme is generally for transmitting digital information, it need not be restricted to the transmission of digital information. As such the phrase "communication scheme" means any method of conveying information from one place to another.

As noted above, during Region B of the power cycle, high voltage noise may be present. If such noise is present, a communication scheme could be used that incorporates an encoding technique which increases signal redundancy. Such increased redundancy may in fact yield greater throughput by reducing the number of times that information must be resent to the recipient due to receipt of information with non-recoverable errors. Alternatively, the communication scheme can incorporate an error correction scheme that increases reliability during regions of the power cycle having increased noise so as to give greater probability that the data can be received without error, even though the number of units of information received per interval of time may in fact decrease over that which could be transmitted without the presence of such noise.

Thus with reference to FIG. 2, during regions of the power cycle where noise may not be severe, a communication scheme can be used that increases the overall throughput while during times of greater noise such as high voltage noise during Region B of the power cycle, a modified version of the communication scheme can be used that is more tolerant to noise. The overall result is greater throughput of broadband communications in the presence of noise where such noise is correlated to the phase of the power cycle.

For 60 Hz power, the time duration of one complete cycle is 16.67 milliseconds (msec). The symbol duration for transmission of digital communication is typically fixed and has a value of from 4 to 200 microseconds (μsec) per symbol depending upon the modulation scheme. Thus for a 16.67 (msec) cycle, there can be from 4,166 symbols per power cycle to 83 symbols per power cycle. Therefore shifts from one communication scheme to another, depending upon which region of the power cycle the communication is being transmitted over, can be agreed upon between both the transmitting and receiving elements of an overall communications system.

In a time division multiple access (TDMA) communication system having an integral number of time slots per power cycle, the communication scheme for one set of time slots associated with a first region can be different from the communication scheme or another region.

Synchronization between the transmitters and receivers forming part of the devices of the overall PLC system is maintained via zero-crossing detection of the power cycle. The shift from one communication scheme to another is managed by timing offsets from the zero-crossing with a fixed integral number of symbols (or time slots) transmitted for each communication scheme.

Figure 3:
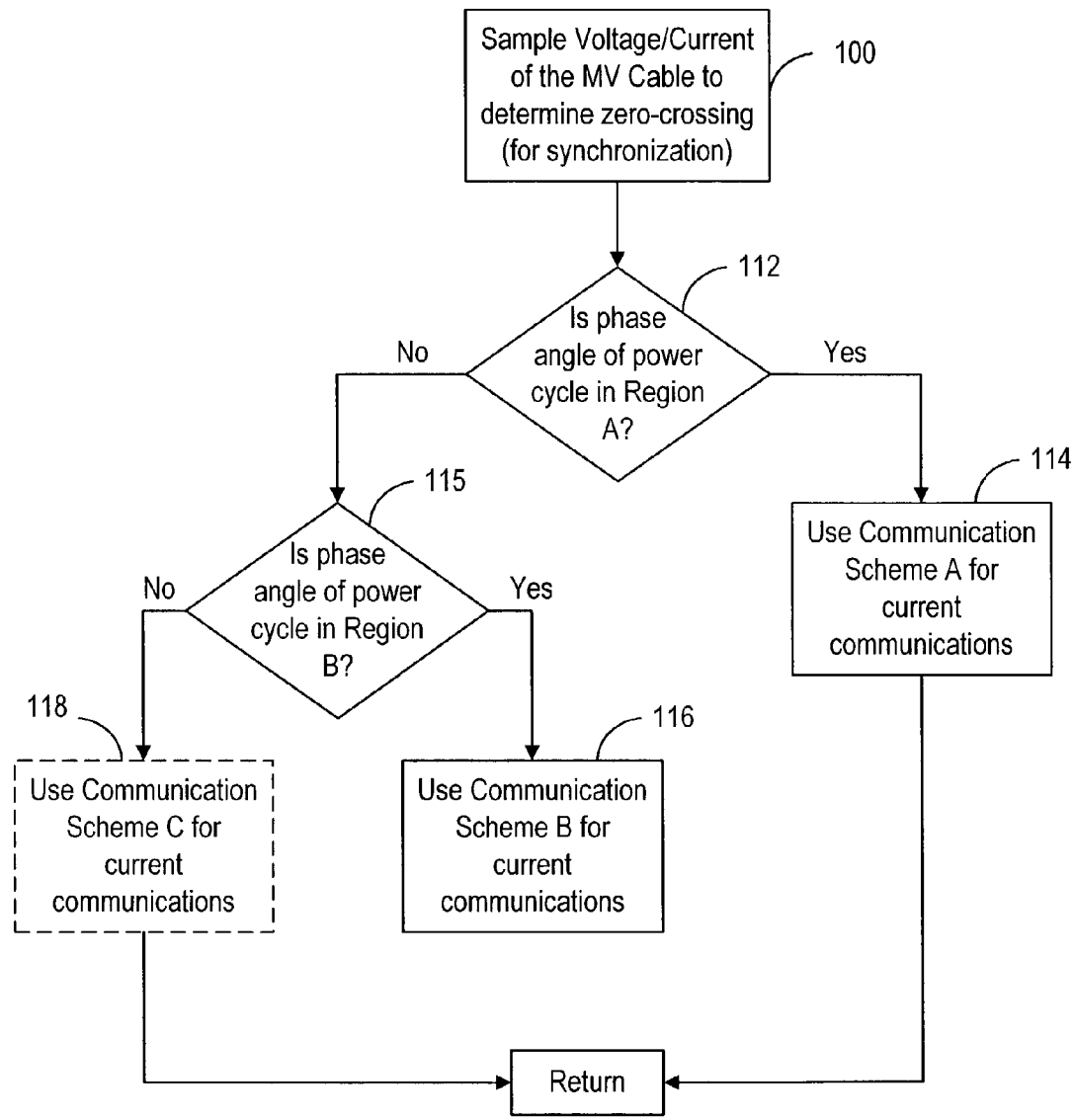
FIG. 3 is a flow chart illustrating how the throughput of a communications system can be improved by varying the communication scheme, such as the modulation scheme and/or error detection correction scheme, depending upon which region of the power cycle the communications are being conveyed over.

FIG. 3 illustrates an overall flow chart for implementing the present invention. Thus at step 100, determination of zero-voltage crossing (or zero-current crossing) is made by periodically sampling the voltage or current of the Mv cable. Such zero-crossing determination can use multiple power cycle zero-crossing determinations to refine the time of zero-crossing.

Once zero-crossing has been determined, then it is relatively straightforward to determine if the power cycle is in a previously defined region (such as shown in FIG. 2) based upon the phase angle of the power cycle relative to zero-crossing. Thus, for instance, a first region such as Region A in FIG. 2 may have a start phase angle of 30 degrees before each zero-crossing and an end phase angle of 30 degrees after each zero-crossing. The actual start and end phase angles of each region are typically predetermined relative to the zero-crossing.

Although the start and end phase angles of a region are typically used to determine when the power cycle is within a particular region, other techniques for determining if the power cycle is within a region can be used, such as determining when a measured parameter (such as voltage or current) is within predetermined values or exceed predetermined values. In the preferred mode for implementing the present invention, the start and stop phase angles relative to zero-crossing of the power cycle are used since it is generally easier to determine the start and end phase angle positions of a region of a power cycle relative to zero-crossing rather than to measure a power line parameter (such as voltage or current). Of course, since the frequency of the power cycle is substantially constant (e.g., 60 Hz), the phase angle of the power cycle can be determined by the length of time since zero-crossing. For a 60 Hz power cycle, one period is 16.67 milliseconds (msec), and therefore one half period (length of time between two zero-crossings) is approximately 8.33 msec. Therefore the phase angle ($\phi(t)$ in degrees) as a function of time is given by:

$$\phi(t)=(360/16.67)*t,$$

where t is in milliseconds.

At step 112, a determination of phase angle relative to zero-crossing is made, and if the phase angle corresponds to the start phase angle of a particular region, such as Region A, then step 114 imposes use of a particular communication scheme, such as Communication Scheme A which is best suited for the anticipated signal-to-noise ratio (SNR) associated with region A.

As seen in FIG. 3, if the phase angle of the power cycle is not within Region A, then decision step 115 determines if the phase angle of the power cycle is in Region B. If it is, then a Communication Scheme B is used during that region as shown in step 116. If the power cycle is divided into more than two regions (such as a Region C—not shown in FIG. 2), then if decision step 115 is negative, a Communication Scheme C (optional step 118) is used, etc. This pattern can be implemented for as many regions as desired within a given power cycle.

Although decision steps 112 and 115 are shown in FIG. 3 for determining if the phase angle of the power cycle is within a given region, the decision step can be implemented strictly by using a local clock (synchronized to other local clocks in the communications segment) which determines the elapsed time from the determined zero-crossing for the power cycle. Thus, for instance, if Region A extends between -30 degrees before zero-crossing and 30 degrees after zero-crossing, this equates to approximately 1.39 msec before and after zero-crossing as constituting Region A. Therefore, by simply timing 1.39 msec after zero-crossing, a determination of the end of Region A can be made and the beginning of the next Region A would simply be 8.33 msec minus 1.39 msec, or 6.94 msec, after zero-crossing. Similarly, for a two-region division of the power cycle, Region B would begin in the above example 1.39 msec after zero-crossing and would end at 6.94 msec after zero-crossing.

Although the above examples with respect to the regions are shown as being symmetric about the zero-crossing of the power cycle, that of course is not necessary for the broad concept of the present invention. In particular, regions of the power cycle associated with certain types of electrical noise may or may not be symmetric about the zero-crossing of the power cycle, and may even be non-symmetric with regard to whether the zero-crossing is on the descending portion or ascending portion of the power cycle.

Figure 5:
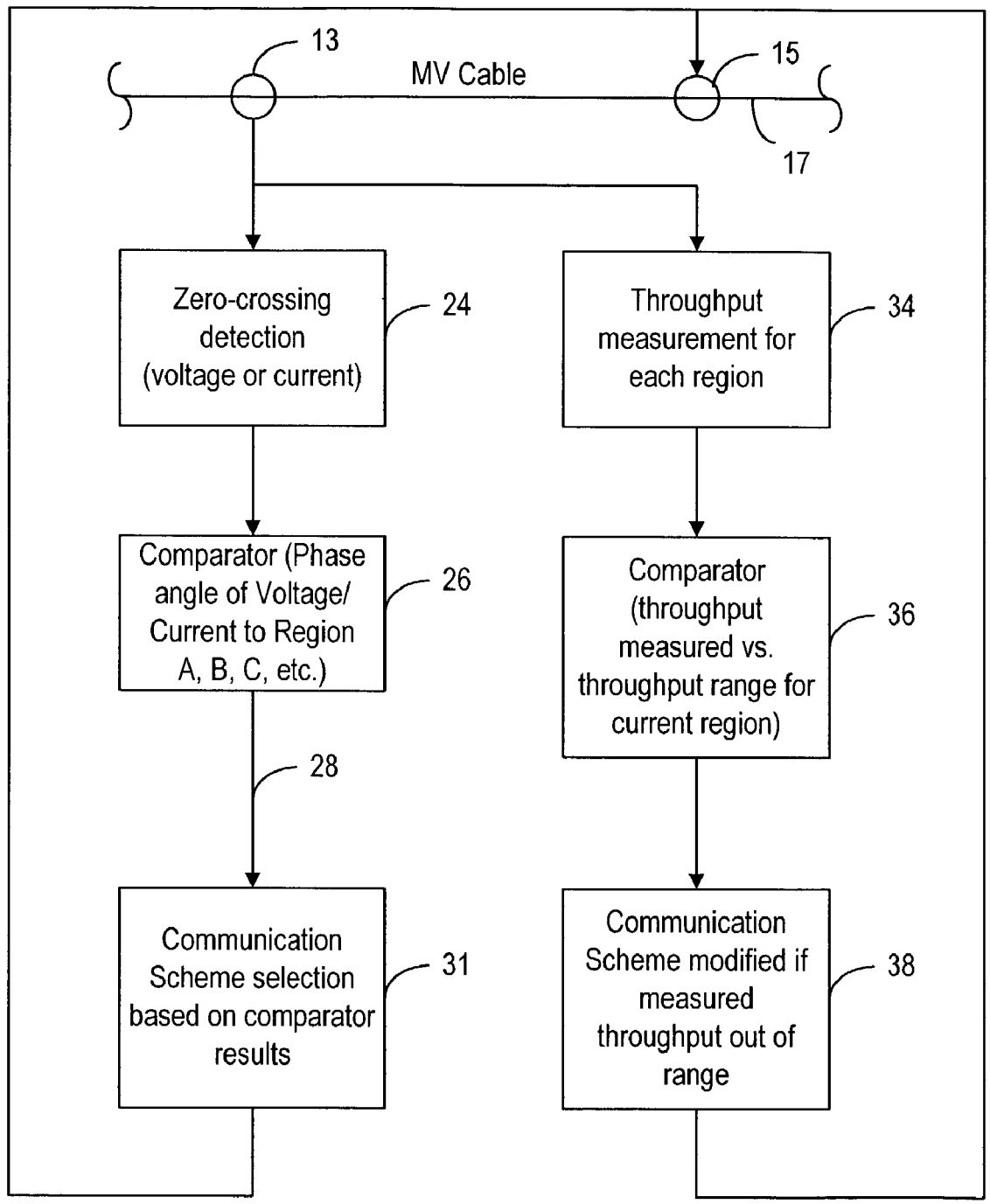
FIG. 5 is a block diagram of a system for implementing the method shown in FIGS. 3 and 4.

FIG. 5 is a block diagram illustrating how the steps shown in FIG. 3 can be implemented for either transmitting or receiving broadband or narrowband communications via an MV cable. It is there seen that the MV cable 17 (L1, L2, L3, etc. of FIG. 1) can be sensed with regard to voltage or current through use of a coupler 13 (corresponding to couplers 12, 22, 37, 42 of FIG. 1). The coupler can be an inductive coupler, capacitive coupler or the like, but in any event produces a measurable parameter which can be sensed by the zero-crossing detection module 24. The phase angle of the power cycle is compared to the start and end phase angles associated with each of the various regions (A, B, etc.) by means of comparator 26. Based upon the comparator output as presented on output line 28, a communication scheme is selected in communication module 31 which in turn is used for purposes of modulating the communication signal which is coupled onto the MV cable such as via coupler 15. Again, any type of coupler can be used such as the preferable inductive coupler.

If a receiver is to be implemented, the same type of voltage/current zero-crossing determination is made, as well as the same type of comparator with the communication scheme module 31 being used for purposes of selecting the communication scheme to be used for receipt of the signal, rather than transmission of the signal to the MV cable, and thus for transfer to the CPE.

The comparator can be implemented by a timing device that compares elapsed time from zero-crossing to the start and end times associated with each region.

The other modules 34, 36 and 38 are optional and will be explained more fully below.

Figure 4:
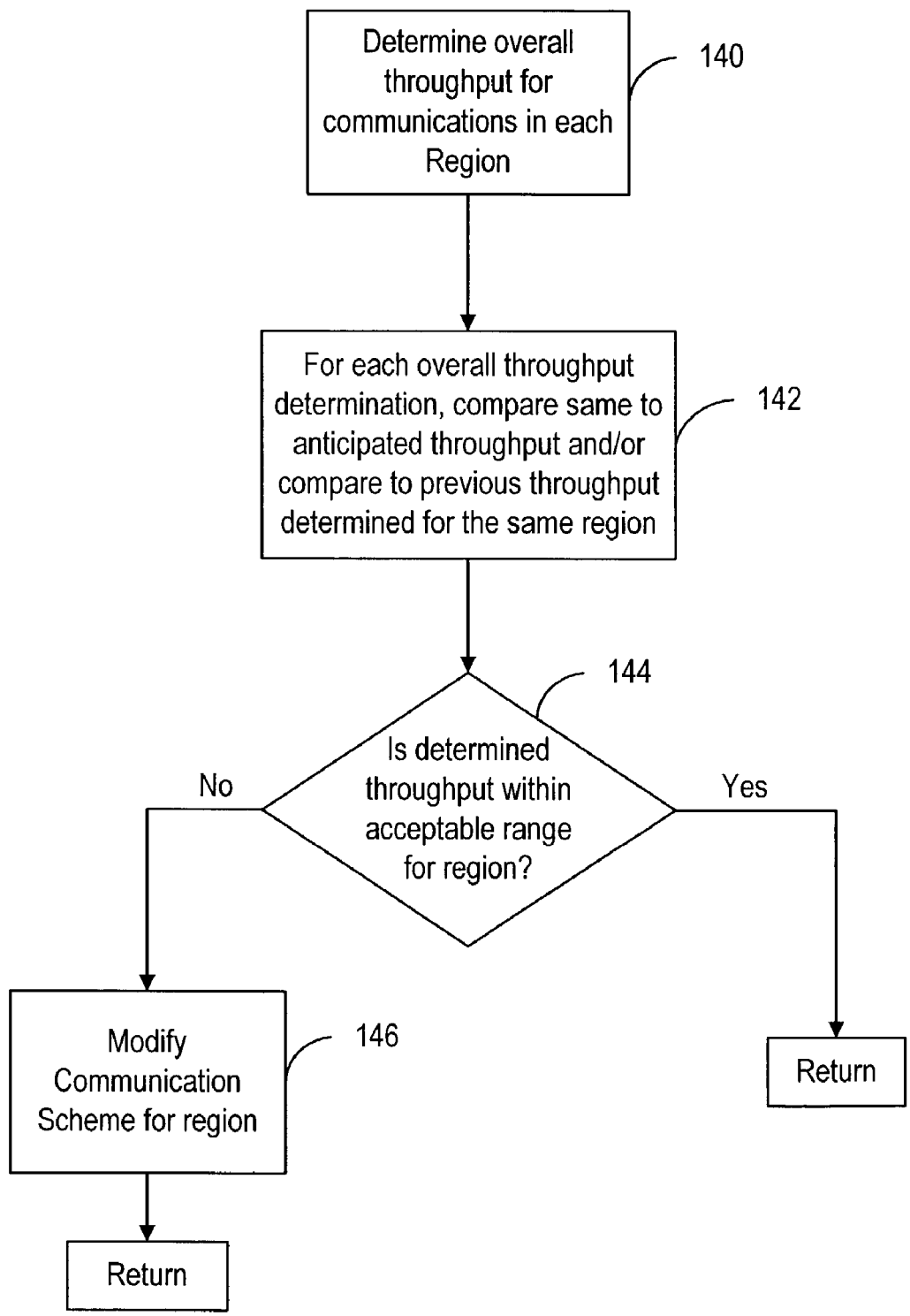
FIG. 4 is a flow chart of an optional feature of the communicating method where the communication scheme can be modified for any region of the power cycle.

In this regard, FIG. 4 is a flow chart showing an optional feature of the present invention; namely, to determine the overall throughput for the communications associated with each (or any) region of the power cycle. Thus at step 140, a determination of the overall throughput for each region is made and at step 142, this determined overall throughput for each region is compared to the anticipated throughput associated with that region. At step 144, if the determined throughput is within an acceptable range for that region, then no modification to the communication scheme for that region is invoked. If the determination is made that the throughput is not within an acceptable range for that region, then step 146 is invoked which modifies the communication scheme for that region so as to improve the overall throughput associated with the region.

It should be noted that although the regions shown in FIG. 2 are symmetric about the zero-crossing of the power cycle, as well as symmetric about the peaks of the power cycle, such symmetry need not be required, depending upon the type of noise which is determined to be present at various phase angles of the power cycle. Indeed, the noise may be related to rectification noise associated with gap noise which may cause high frequency noise in either the ascending or descending portion of the power cycle, but not in both portions. The overall concept of the present invention is to determine regions of the power cycle where the noise level of that region is different from that of other regions and to adjust the communication scheme for each region in order to maximize overall information throughput.

It should further be noted that a determination can be made that the noise associated with some region of the power cycle is so great that the best alternative with respect to a communication scheme for that region is to have no communication for that region and thereby minimize the amount of resending of information because of errors associated with communications made in that region.

Finally, FIG. 5 includes optional modules 34, 36 and 38 which correspond with the steps shown in FIG. 4 for determining throughput throughout the various regions selected (module 34), comparing those determined throughputs with a range associated with each region as previously determined (module 36) and, modifying the communication scheme if the throughput is outside of a range (module 38).

Although the present invention has been described with particular exemplary regions, it should be realized to those skilled in the art that the particular regions of the power cycle for which phase related noise is found to be present would, of course, depend upon the conditions of the particular electrical power distribution system. Therefore the regions shown herein are illustrative and should not be interpreted in a limiting sense. Furthermore, the communication schemes used are also illustrative of how the present invention can be implemented and should not be interpreted in a limiting sense.

Having described the invention, what is claimed is:

1. A method of adjusting the throughput of a communications system that uses a cable of an electrical power distribution system as a communication pathway, wherein the power distribution has a repetitive power cycle period, comprising the steps of:
   a) determining the phase of the power distribution power cycle; and
   b) determining if the phase of the power distribution power cycle is within a predetermined region $R_i$, for i=1, . . . , N, were N is an integer $\geq 2$, where each region $R_1$ extends over a portion of the power distribution power cycle, and if so, using a predetermined communication scheme during said region $R_1$ for transmitting and receiving information that is communicated over the electrical power distribution system cable.

2. A method as defined in claim 1, wherein the step of determining the phase of the power distribution power cycle is performed by determining when there is a zero crossing of the power cycle.

3. A method as defined in claim 2, wherein N=2 and wherein $Region_1$ is centered on the zero crossing of the power cycle and extends a predetermined number of degrees on each side of the zero crossing, and where $Region_2$ is the remainder of the power cycle.

4. A method as defined in claim 3, wherein the voltage of the power distribution power cycle is used for determining the phase of the power distribution power cycle.

5. A method as defined in claim 3, wherein the current of the power distribution power cycle is used for determining the phase of the power distribution power cycle.

6. A method as defined in claim 3, wherein $Region_2$ is related to high frequency noise and wherein the predetermined communication scheme for said region has increased reliability of communicating information than the predetermined communication scheme for $Region_1$.

7. A method as defined in claim 1, wherein a predetermined communication scheme associated with a particular $Region_j$, where j is a single integer, is a null communication scheme for said region.

8. A method as defined in claim 1, wherein the predetermined communication scheme used for any $Region_j$ having a higher noise content than another $Region_k$, is to use a predetermined communication scheme for $Region_j$ that uses a modulation scheme of lesser symbol efficiency than that used for $Region_k$; where j and k are integers.

9. A method as defined in claim 1, wherein the predetermined communication scheme used for any $Region_j$ having a higher noise content than another $Region_k$, is to use a predetermined communication scheme for $Region_j$ that uses an error correction scheme that has greater error correcting capability than that used for $Region_k$; where j and k are integers.

10. A method as defined in claim 1, further comprising the steps of:
    determining the throughput for communications in at least one $Region_j$, and if the throughput for $Region_j$ is outside a predetermined range of throughput values for said region, then modifying the predetermined communication scheme for use in $Region_j$, where j is an integer.

11. A method as defined in claim 10, wherein the step of determining the phase of the power distribution power cycle is performed by determining when there is a zero crossing of the power cycle.

12. A method as defined in claim 11, wherein N=2 and wherein $Region_1$ is centered on the zero crossing of the power cycle and extends a predetermined number of degrees on each side of the zero crossing, and where $Region_2$ is the remainder of the power cycle.

13. A method as defined in claim 12, wherein the voltage of the power distribution power cycle is used for determining the phase of the power distribution power cycle.

14. A method as defined in claim 12, wherein the current of the power distribution power cycle is used for determining the phase of the power distribution power cycle.

15. A method as defined in claim 10, wherein the predetermined communication scheme used for any $Region_j$ having a higher noise content than another $Region_k$, is to use a predetermined communication scheme for $Region_j$ that uses a modulation scheme of lesser symbol efficiency than that used for $Region_k$; where j and k are integers.

16. A method as defined in claim 10, wherein the predetermined communication scheme used for any $Region_j$ having a higher noise content than another $Region_k$, is to use a predetermined communication scheme for that uses an error correction scheme for $Region_j$ that has greater error correcting capability than that used for $Region_k$;
    where j and k are integers.

17. A system for adjusting the throughput of a communications system that uses a cable of an electrical power distribution system as a communication pathway, wherein the power distribution has a repetitive power cycle period, comprising:
    a) means for determining the phase of the power distribution power cycle; and
    b) means for determining if the phase of the power distribution power cycle is within a predetermined region $R_i$, for i=1, . . . , N, were N is an integer $\geq 2$, where each region $R_1$ extends over a portion of the power distribution power cycle; and
    c) means for using a predetermined communication scheme during said region $R_1$ for transmitting and receiving information that is communicated over the electrical power distribution system cable if the determined phase of the power distribution power cycle is within region $R_i$.

18. A system as defined in claim 17, wherein the means for determining the phase of the power distribution power cycle determines when there is a zero crossing of the power cycle for purposes of determining the phase of the power distribution power cycle.

19. A system as defined in claim 18, wherein N=2 and wherein $Region_1$ is centered on the zero crossing of the power cycle and extends a predetermined number of degrees on each side of the zero crossing, and where $Region_2$ is the remainder of the power cycle.

20. A system as defined in claim 18, wherein the voltage of the power distribution power cycle is used by the means for determining the phase of the power distribution power cycle as the parameter that is measured for determining the phase of the power distribution power cycle.

21. A system as defined in claim 18, wherein the current of the power distribution power cycle is used by the means for determining the phase of the power distribution power cycle as the parameter that is measured for determining the phase of the power distribution power cycle.

22. A system as defined in claim 18, wherein $Region_2$ is related to high frequency noise and wherein the predetermined communication scheme for said region has increased reliability of communicating information than the predetermined communication scheme for $Region_1$.

23. A system as defined in claim 17, wherein a predetermined communication scheme associated with a particular $Region_j$, where j is a single integer, is a null communication scheme for said region.

24. A system as defined in claim 17, wherein the predetermined communication scheme used for any $Region_j$ having a higher noise content than another $Region_k$, is to use a predetermined communication scheme for $Region_j$ that uses a modulation scheme of lesser symbol efficiency than that used for $Region_k$; where j and k are integers.

25. A system as defined in claim 17, wherein the predetermined communication scheme used for any $Region_j$ having a higher noise content than another $Region_k$, is to use a predetermined communication scheme for $Region_j$ that uses an error correction scheme that has greater error correcting capability than that used for $Region_k$; where j and k are integers.

26. A system as defined in claim 17, further comprising:
means for determining the throughput for communications in at least one $Region_j$; and
means for modifying the predetermined communication scheme for use in $Region_j$, if the determined throughput for $Region_j$ is outside a predetermined range of throughput values for said region, where j is an integer.

27. A system as defined in claim 26, wherein the means for determining the phase of the power distribution power cycle determines when there is a zero crossing of the power cycle for purposes of determining the phase of the power distribution power cycle.

28. A system as defined in claim 27, wherein N=2 and wherein $Region_j$ is centered on the zero crossing of the power cycle and extends a predetermined number of degrees on each side of the zero crossing, and where $Region_2$ is the remainder of the power cycle.

29. A system as defined in claim 28, wherein the voltage of the power distribution power cycle is used by the means for determining the phase of the power distribution power cycle as the parameter that is measured for determining the phase of the power distribution power cycle.

30. A system as defined in claim 28, wherein the current of the power distribution power cycle is used by the means for determining the phase of the power distribution power cycle as the parameter that is measured for determining the phase of the power distribution power cycle.

31. A system as defined in claim 26, wherein the predetermined communication scheme used for any $Region_j$ having a higher noise content than another $Region_k$, is to use a predetermined communication scheme for $Region_j$ that uses a modulation scheme of lesser symbol efficiency than that used for $Region_k$; where j and k are integers.

* * * * *

UNITED STATES PATENT AND TRADEMARK OFFICE
CERTIFICATE OF CORRECTION

| | |
|---|---|
| PATENT NO. | : 7,307,357 B2 |
| APPLICATION NO. | : 10/261364 |
| DATED | : December 11, 2007 |
| INVENTOR(S) | : Kopp |

It is certified that error appears in the above-identified patent and that said Letters Patent is hereby corrected as shown below:

Column 8, line 63, claim 17, line 14, please delete "$R_1$" and replace with --$R_i$--.

Column 10, line 17, claim 28, line 2, please delete "Region;" and replace with --$Region_1$--.

Signed and Sealed this

Twentieth Day of May, 2008

JON W. DUDAS
*Director of the United States Patent and Trademark Office*